July 31, 1928.
C. P. EISENHAUER
1,678,770
TANK
Filed Oct. 12, 1925
3 Sheets-Sheet 1
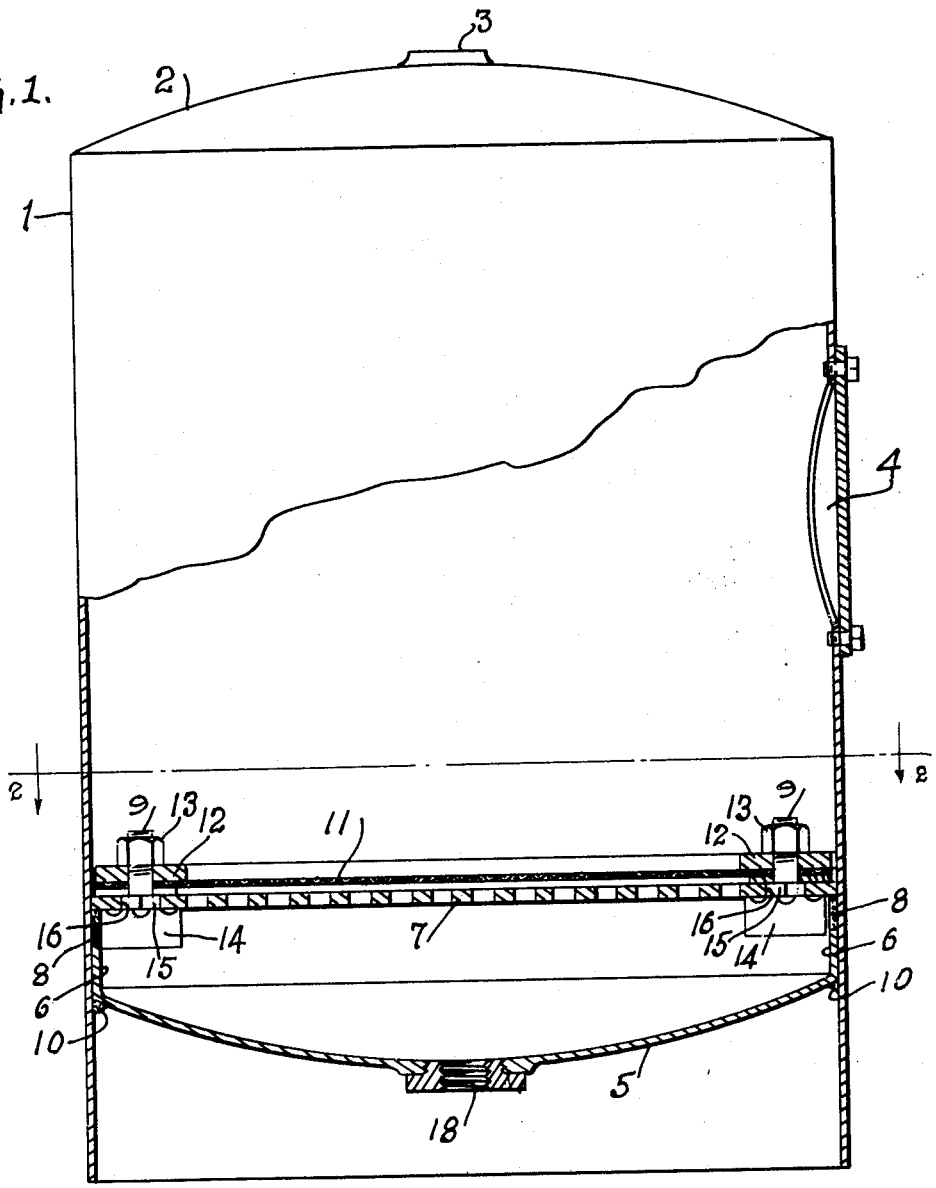
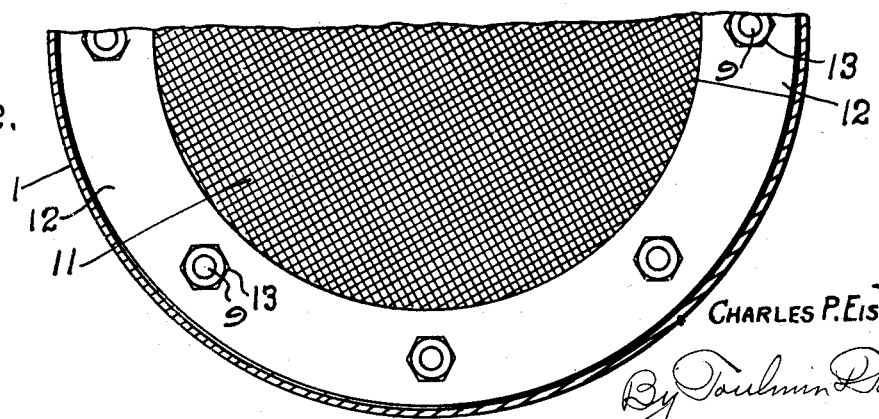
Inventor
CHARLES P. EISENHAUER,
By Toulmin & Toulmin,
Attorneys July 31, 1928.
C. P. EISENHAUER
TANK
Filed Oct. 12, 1925      3 Sheets-Sheet 2
1,678,770
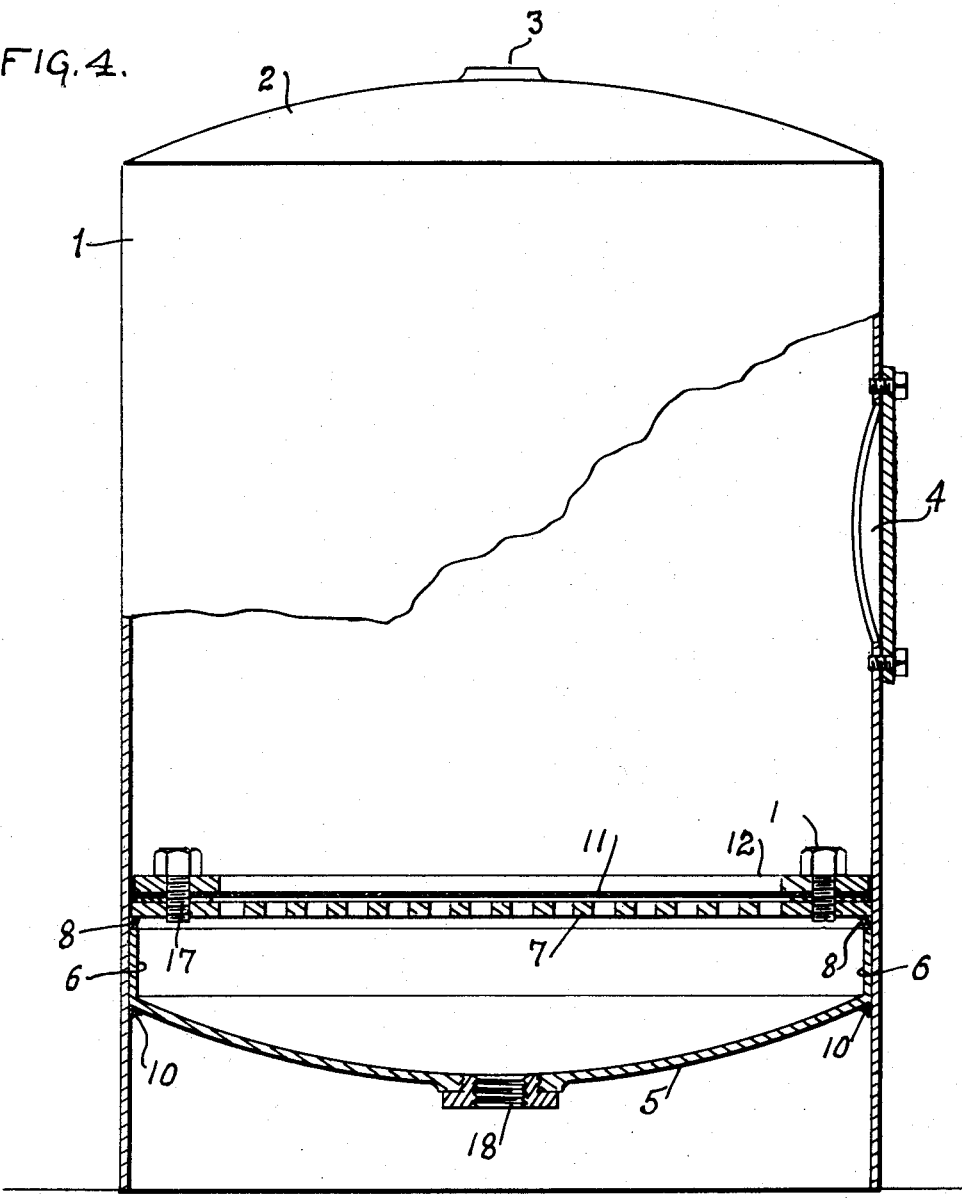
FIG. 4.
FIG. 3.
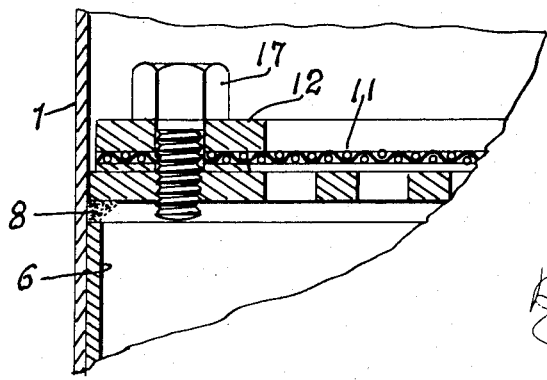
CHARLES P. EISENHAUER,
By Taulmin & Taulmin,
Attorneys.

July 31, 1928.  
C. P. EISENHAUER  
TANK  
Filed Oct. 12, 1925

Inventor  
CHARLES P. EISENHAUER  
By Taulmin &Taulmin,  
Attorneys

Patented July 31, 1928.

1,678,770

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

TANK.

Application filed October 12, 1925. Serial No. 61,994.

My invention relates to tanks and in particular to screens therein.

It is the object of my invention to provide means of mounting a screen, the construction of which is particularly adaptable for use in filters and water softeners, especially where tanks have to be galvanized.

It is a further object of my invention to provide means of assembling the head of the tank and the grating as a unit which can be inserted in the tank at either end and the whole structure galvanized. After the galvanizing operation, it is the object of my invention to provide means of inserting the screens in the tank and of clamping the screens in position.

It is a further object to provide a method of manufacturing tanks which will enable the parts to be successfully assembled and treated in the manner hereinbefore described.

It is a further object to so arrange the screens that they may be removed for replacement or repair, and that there should be the minimum of chance of any leakage of the tank as the result of this construction.

Referring to the drawings:

Figure 1 is a side elevation of a tank partially in section showing the installation of the screen, grating, retaining ring and head in one end of the tank;

Figure 2 is a section on the line 2—2 of Figure 1;

Figure 3 is an enlarged detail of the method of attachment of the several parts to one another by means of a bolt;

Figure 4 is a side elevation of the tank partially broken away at one end adapted to show the modified method of attachment of the screen.

Figure 5:
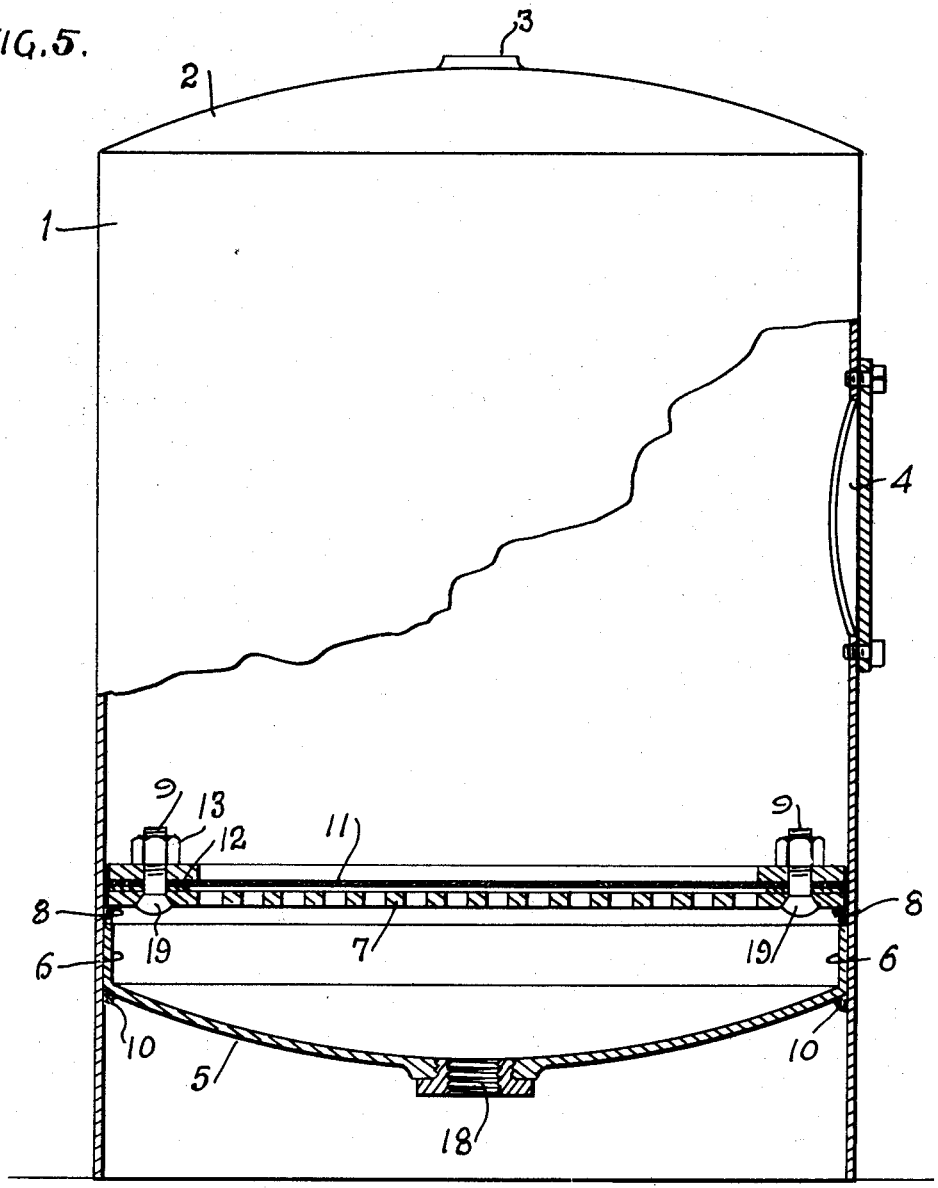
Figure 5 is an additional view showing a modification of the method of attachment of the screen to the grating.

Referring to the drawings in detail, 1 represents a cylinder composed of side walls of the tank. The upper end of the tank is closed by a head 2 which has an aperture 3 therein. The side wall of the cylinder 1 is provided with an aperture 4 known as a hand hole, which is suitably closed when the tank is in operation.

In the lower end of the tank, there is a bottom member 5 constructed like the top 2, having flanges 6 located within the side walls of the tank 1. This bottom 5 or top 2 carries a grating 7 which is here shown welded by the weld 8 to the flange of the bottom 5. The bolts 9 are then put in place temporarily and the structure inserted within the bottom of the tank where it is welded in position by the weld 10. The tank is similarly arranged at either end and is then sent to be galvanized. After the galvanizing operation, the screen 11, which is preferably made of Monel metal and is folded, is then inserted within the tank through the hand hole 4 and is spread upon the grating 7. On the edges of the screen 11 are fiber gaskets 12 around the bolts 9 beneath the nuts 13. These nuts 13 are taken off the bolts 9 temporarily while the screen is being placed and are then restored so that the clamping action may take place.

It will be noted that the head 14 of the bolt is provided with a shoulder 15 which projects into a square aperture 16 in the grating to prevent the bolt from turning when the nut 13 is turned up.

In Figure 4, it will be noted that the bolts 9 are supplanted by screws 17, otherwise the construction is substantially the same. The bottom 5 is provided with an aperture 18.

In Figure 5, it will be noted that countersunk heads 19 are provided in the center of the rivets on the bolts 9.

It will be understood that I desire to comprehend within my invention such modifications as may be necessary to adapt it to varying conditions and uses.

Having thus fully described my invention, what I claim as new and desire to secure by Letters Patent, is:

1. In a method of manufacturing tanks, attaching a grating to the inside flange of the end of a tank, inserting the grating and end within one end of the tank, attaching the end to the tank, galvanizing the tank and end, inserting a screen through a hand hole in the side of a tank, placing the screen upon said grating so as to cover substantially the entire area thereof and removably fastening the screen to said grating.

2. In combination, a tank wall, detachable heads inserted therein and attached thereto, gratings attached to said heads, screens mounted on said gratings and means of attaching said screens to said gratings, said attaching means consisting of a retaining ring on the margin of each screen.

3. In combination, a tank wall, detachable heads inserted therein and attached thereto, gratings attached to said heads, screens mounted on said gratings and means of attaching said screens to said grating, said attaching means consisting of a retaining ring on the margin of each screen, said attaching means consisting of bolts having a portion of their heads projecting into apertures in the grating to prevent the bolts from turning.

4. In a tank, a tank wall, ends for said tank having flanges attached within said wall, a grating mounted on said flanges on the inner end thereof, a screen mounted on said grating and a ring mounted on said screens about the margin thereof and bolts threaded through said ring, screen and grating for attaching several members to one another.

In testimony whereof, I affix my signature.

CHARLES P. EISENHAUER.